(12) United States Patent
Fakhoury (10) Patent No.: US 9,145,937 B2
(45) Date of Patent: Sep. 29, 2015

(54) VENTED BRAKE DRUM

(71) Applicant: KIC HOLDINGS, INC., Vancouver, WA (US)

(72) Inventor: Omar J. Fakhoury, Vancouver, WA (US)

(73) Assignee: KIC LLC, Vancouver, WA (US)

( * ) Notice: Subject to any disclaimer, the term of this patent is extended or adjusted under 35 U.S.C. 154(b) by 13 days.

(21) Appl. No.: 14/018,343

(22) Filed: Sep. 4, 2013

(65) Prior Publication Data

US 2014/0069752 A1   Mar. 13, 2014

Related U.S. Application Data

(60) Provisional application No. 61/699,740, filed on Sep. 11, 2012, provisional application No. 61/727,535, filed on Nov. 16, 2012.

(51) Int. Cl.
*F16D 65/10*  (2006.01)
*F16D 65/827*  (2006.01)

(52) U.S. Cl.
CPC .............. *F16D 65/10* (2013.01); *F16D 65/827* (2013.01)

(58) Field of Classification Search
CPC . F16D 65/10; F16D 65/0006; F16D 205/005; F16D 51/00; F16D 2055/0037; F16D 2065/132; F16D 2065/1332; F16D 2065/1316; F16D 2065/1344; F16D 65/78

USPC .... 188/218 A, 218 R, 264 A, 264 AA, 264 R
See application file for complete search history.

(56) References Cited

U.S. PATENT DOCUMENTS

| | | | | |
|---|---|---|---|---|
| 1,670,320 A | * | 5/1928 | Thompson | 188/218 R |
| 1,727,043 A | * | 9/1929 | Thompson | 188/78 |
| 1,953,217 A | * | 4/1934 | Evans | 188/218 R |
| 2,174,611 A | * | 10/1939 | Ash | 188/218 A |
| 3,016,269 A | * | 1/1962 | De Lorean | 301/6.3 |
| 3,127,959 A | | 4/1964 | Wengrowski | |
| 5,097,927 A | * | 3/1992 | Siegrist | 188/218 R |
| 6,698,557 B2 | | 3/2004 | Hayes et al. | |
| 8,181,753 B2 | | 5/2012 | Levering et al. | |

FOREIGN PATENT DOCUMENTS

| | | | |
|---|---|---|---|
| CN | 20201772 | * | 10/2011 |
| CN | 202017722 | * | 10/2011 |

* cited by examiner

*Primary Examiner* — Anna Momper
*Assistant Examiner* — San Aung
(74) *Attorney, Agent, or Firm* — Marger Johnson (57) ABSTRACT

The Vented Brake Drum has a pattern of through holes arranged around it circumferentially, the holes intersecting the inside cylindrical braking surface radially of the inner surface as well as intersecting the outside surface of the drum. The holes may be drilled into the finished drum or cast into the drum prior to machining the inner braking surface of the drum, to present a smooth albeit perforated internal circumferential surface (ID) to the arcuate brake lining.

8 Claims, 8 Drawing Sheets

VENTED BRAKE DRUM

CROSS REFERENCE TO RELATED APPLICATIONS

This application claims the benefit of U.S. Provisional Application Ser. No. 61/699,740, filed Sep. 11, 2012 and U.S. Provisional Application Ser. No. 61/727,535, filed Nov. 16, 2012, both application hereby incorporated in their entirety by reference.

BACKGROUND OF THE INVENTION

This invention relates to drum brakes for vehicles and more particularly to brake drum designs for cooler operation.

Figure 1:
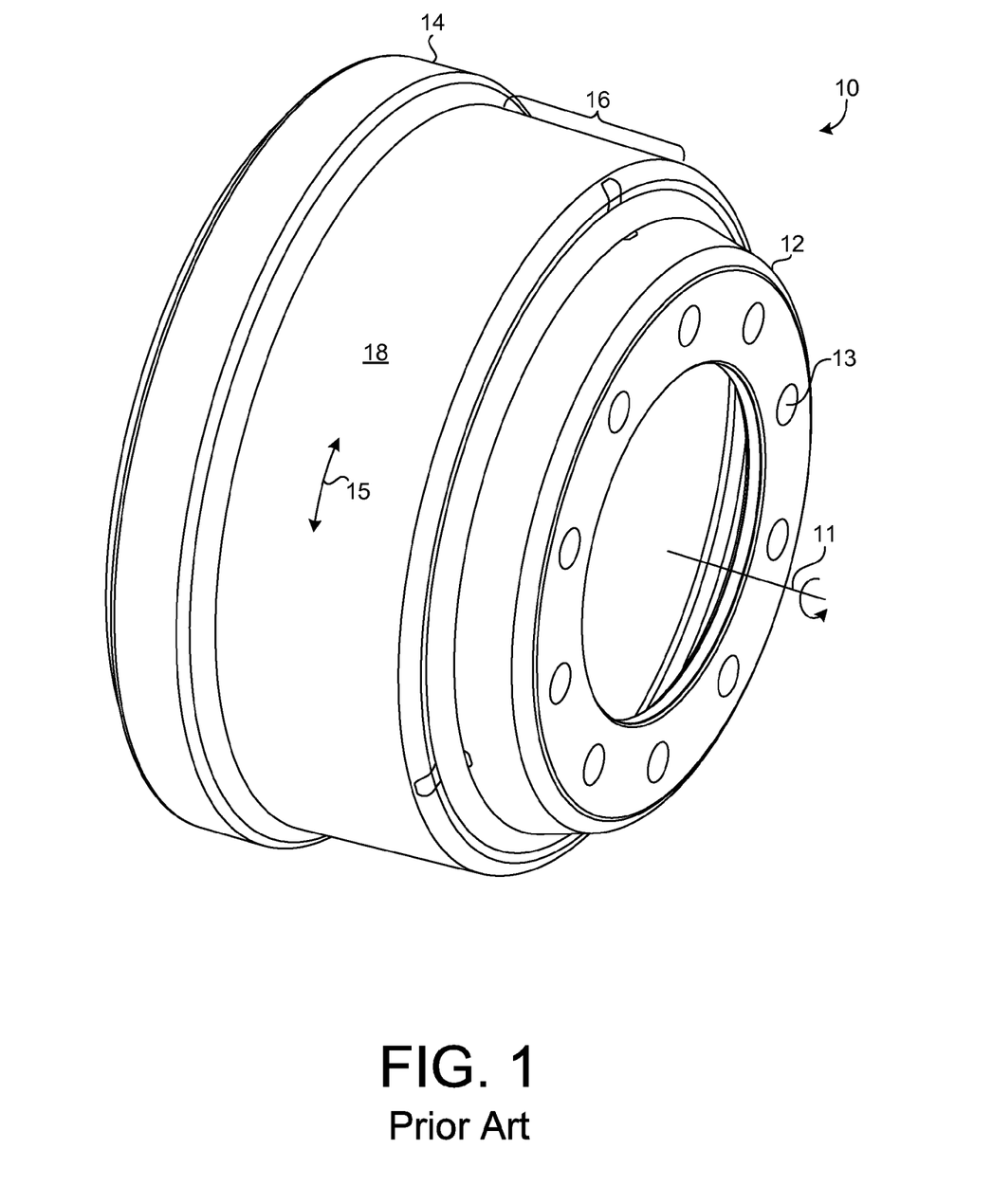
FIGS. 1, 2 and 3 are perspective views of a conventional brake drum.
Figure 2:
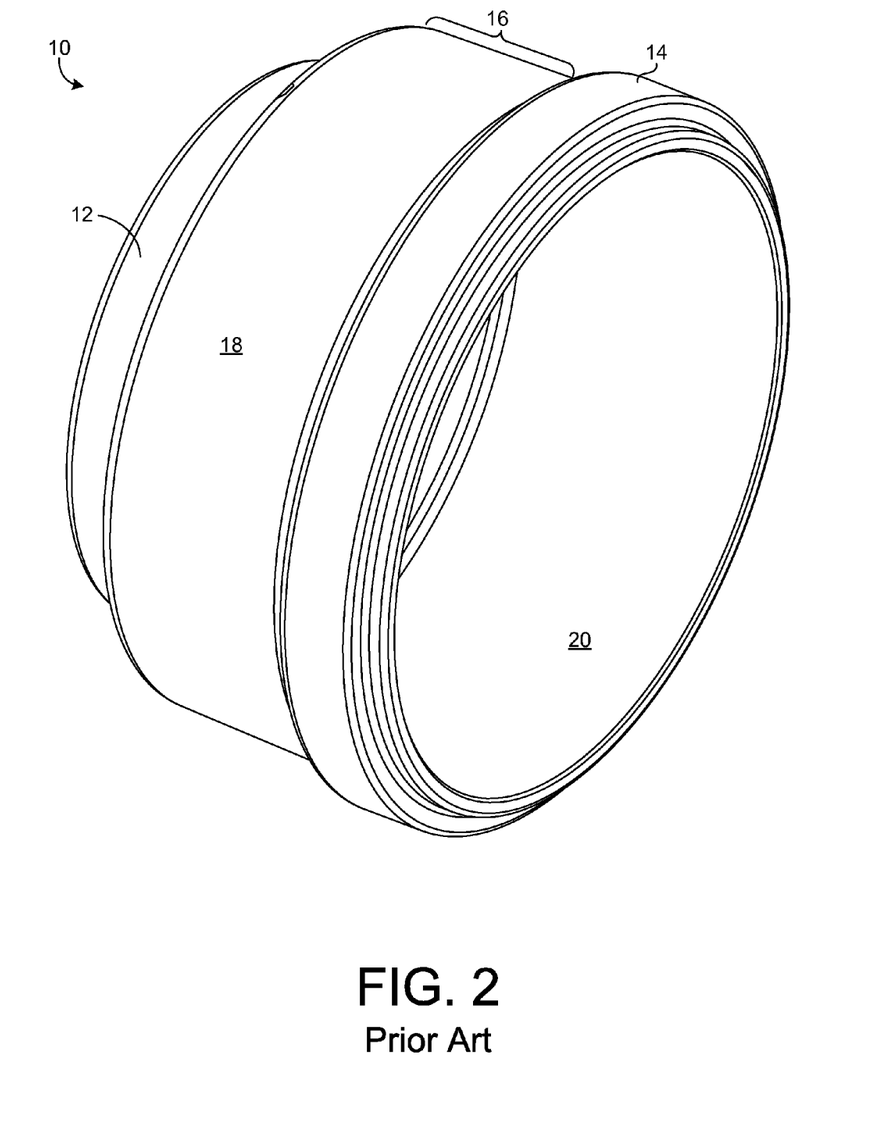
Figure 3:
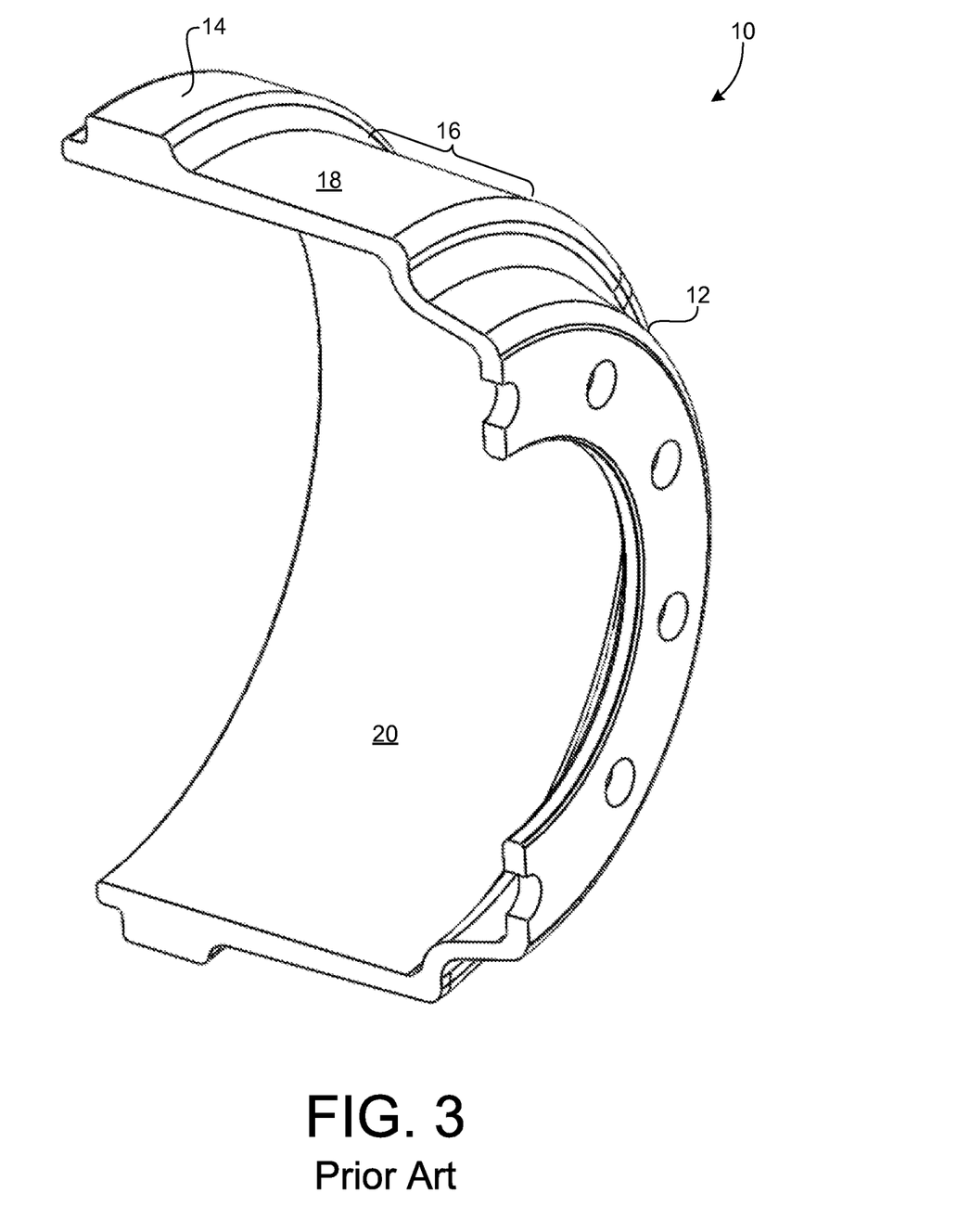

The conventional brake drum as shown in FIGS. 1, 2 and 3 has a solid cylindrical shape, and the internal surface (the internal diameter or "ID") is a smooth, contiguous or unperforated cylinder against which the brake lining of a semicircular brake shoe (not shown) is frictionally engaged for braking. The images are for a 16.5×7 brake drum which is the most common size steel alloy or gray iron brake drum for heavy-duty tractors and trailers.

Brake drums are known to have been formed with external or internal fins to assist in cooling the drums. U.S. Pat. Nos. 3,127,959; 6,698,557 and 8,181,753 disclose various such approaches. The concept of drilling holes through the wall thickness of a braking surface has thus far been restricted to disc brake rotors, which are flat. However, this concept has never been applied to S-CAM brake drums which are a completely different braking system than disc brake rotors. For instance, the brake rotor system uses a caliper to squeeze a rotating disk, thus engaging the frictional surfaces. In contrast, the brake drum system uses an internal shoe to apply radial pressure to the cylindrical brake drum surface.

Brake fade occurs after repeated or sustained application of drum brakes which creates a high temperature condition and contributes to a reduction of stopping power. Significant improvement in brake performance can be obtained by optimizing the thermal performance of the brake drum. Although conventional brake drums continue to perform successfully in the field, a need remains for a brake drum design which maintains cooler temperatures than the conventional brake drum.

SUMMARY OF INVENTION

The Vented Brake Drum concept of the present invention utilizes drilled or cast-in openings—such as holes or slots—extending depthwise through the otherwise solid wall of the cylindrical drum portion of a typical brake drum. Basically, the drum has a pattern of through holes arranged circumferentially, the holes intersecting the inside cylindrical braking surface radially of the inner surface as well as intersecting the outside surface of the drum. The holes may be drilled into the finished drum or cast into the drum prior to machining the inner braking surface of the drum, to present a smooth, albeit perforated, internal circumferential surface (ID) to the arcuate brake lining.

This invention improves cooling of the drum brake and reduces brake fade. Other features and advantages will become apparent from the following detailed description which proceeds with reference to the accompanying drawings.

DETAILED DESCRIPTION

As shown in FIGS. 1-3, a conventional brake drum 10 is a cylindrical structure which, in use, rotates about an axis 11 in a rotation direction 15. The brake drum 10 comprises an annular outboard wheel-mounting portion 12 having a ring of wheel-bolt holes 13, an annular inboard rim portion 14 axially opposite the hub portion, and a drum portion 16 having a cylindrical shape extending between the hub portion and the rim portion. The drum portion 14 has a circumferential outer surface 18, and a cylindrical internal braking surface 20 against which a brake lining of a semicircular brake shoe (not shown) can be frictionally engaged for braking.

Figure 4:
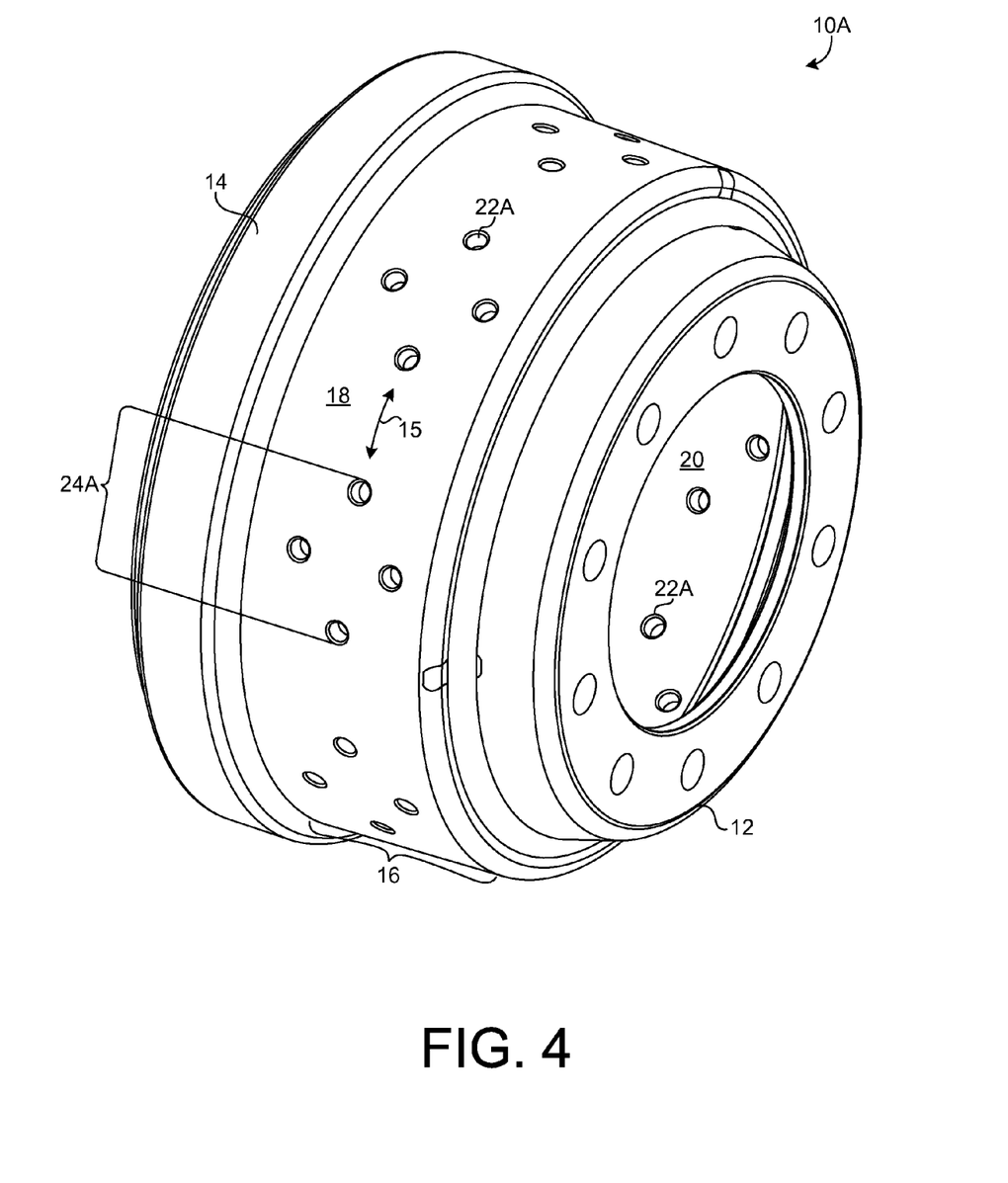
FIGS. 4, 5 and 6 are perspective views of a first embodiment of a ventilated brake drum according to the invention.
Figure 5:
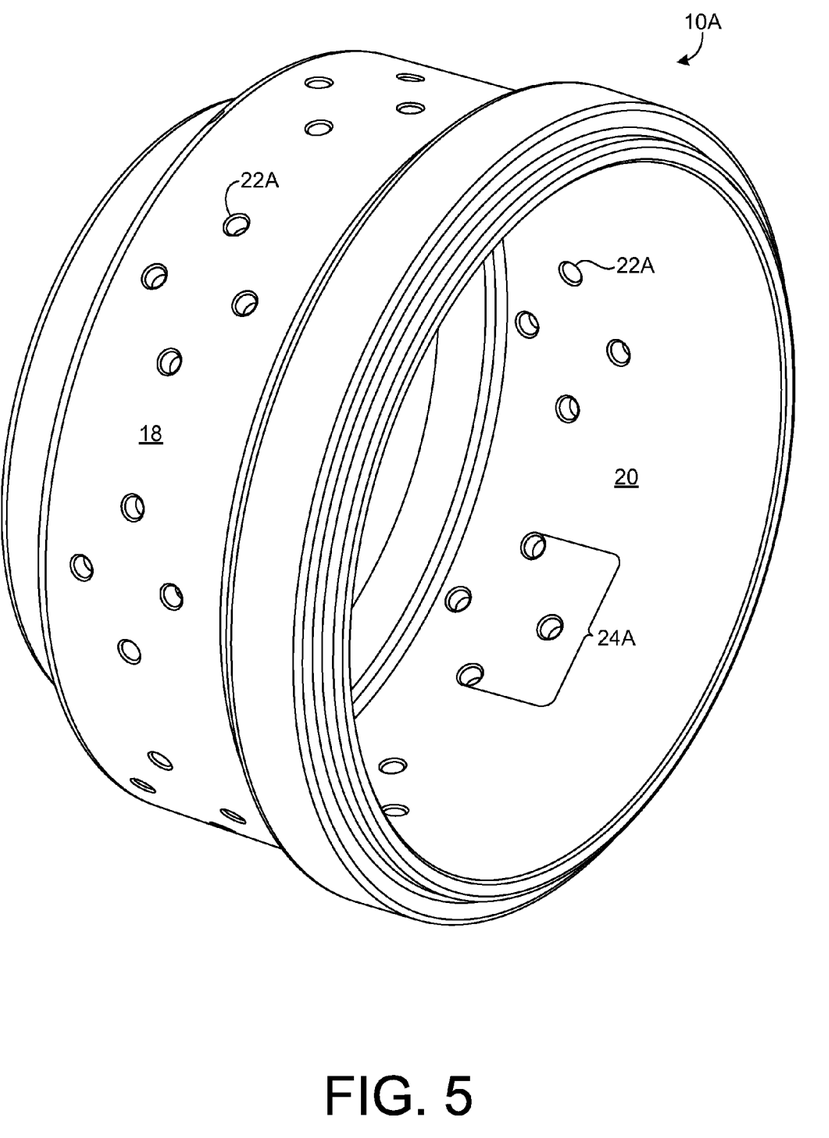
Figure 6:
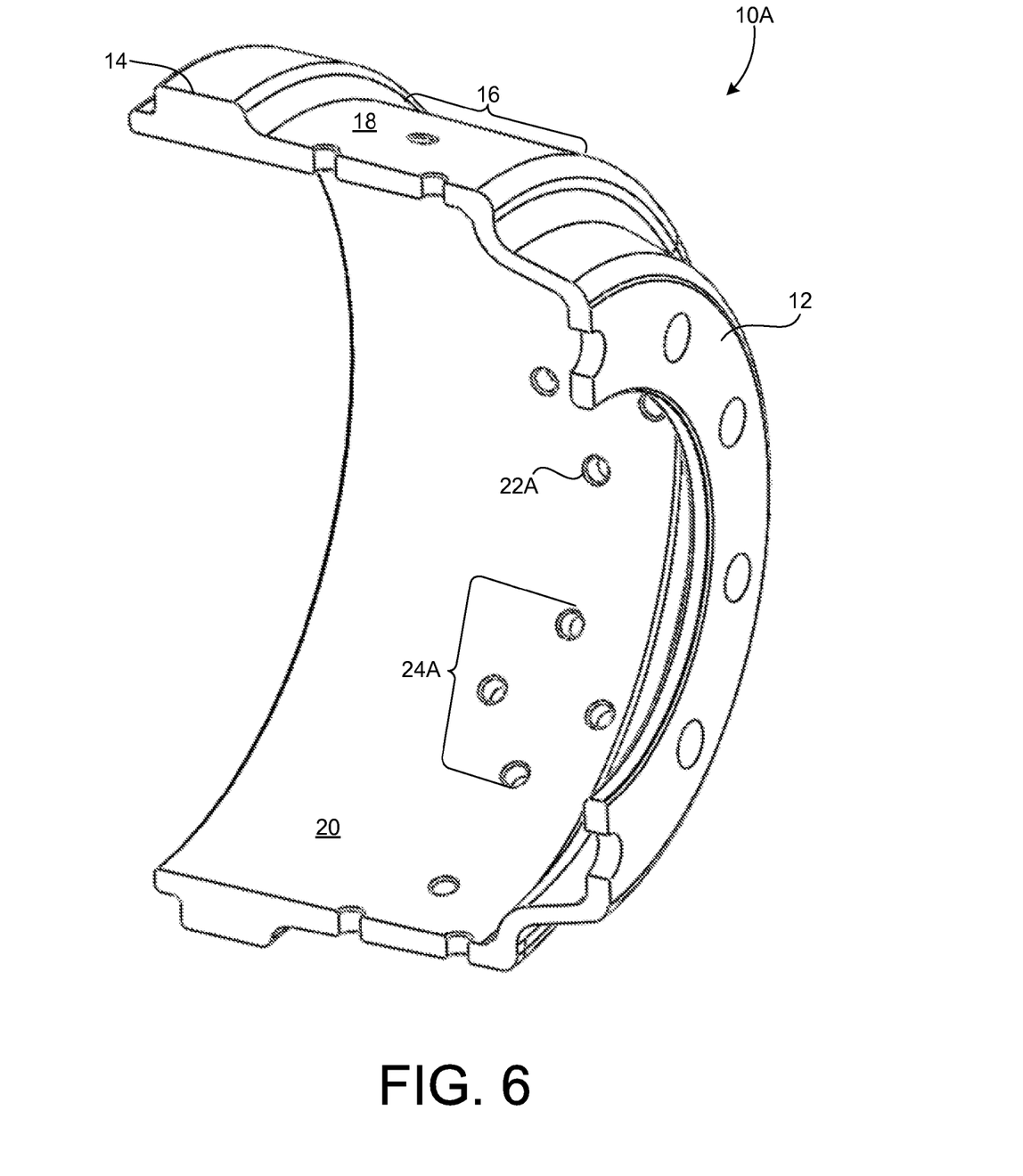

A first embodiment of the invention, shown in FIGS. 4-6, is incorporated in a brake drum 10A, like drum 10 but with the further features next described. In accordance with the invention, a series of spaced-apart vent openings 22A are formed in the drum portion 16 of the brake drum. These openings extend depthwise through the drum portion 16 from the outer surface 18 to the internal braking surface 20. The series of vent openings 22A are distributed in a pattern 24A that is repeated circumferentially around the drum portion. In the first embodiment, the vent openings 22A are cylindrical in shape, with an example diameter of 0.5 inch (1.25 cm.) and arranged in a diamond pattern 24A, repeated circumferentially around the drum portion 16.

Figure 7:
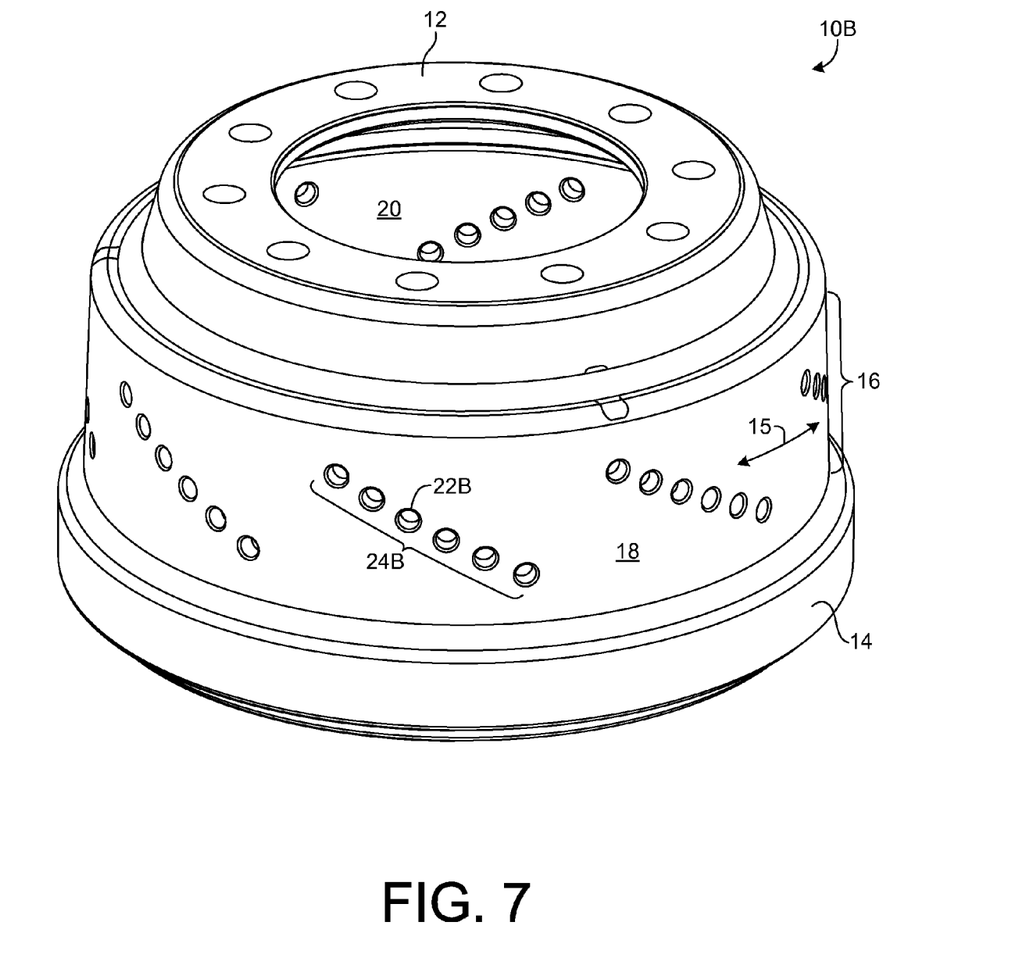
FIGS. 7 and 8 are perspective views of second and third embodiments of a ventilated brake drum according to the invention.

A second embodiment of vented brake drum 10B shown in FIG. 7 is generally similar to the first embodiment but has a different pattern 24B of vent openings repeated circumferentially around the drum portion. In this embodiment, the pattern 24B of openings 22B is in the form of a line oriented diagonally across the internal braking surface. That is, each line of half dozen vent openings follows a helical path across the direction of rotation 15 of the drum portion 16.

Figure 8:
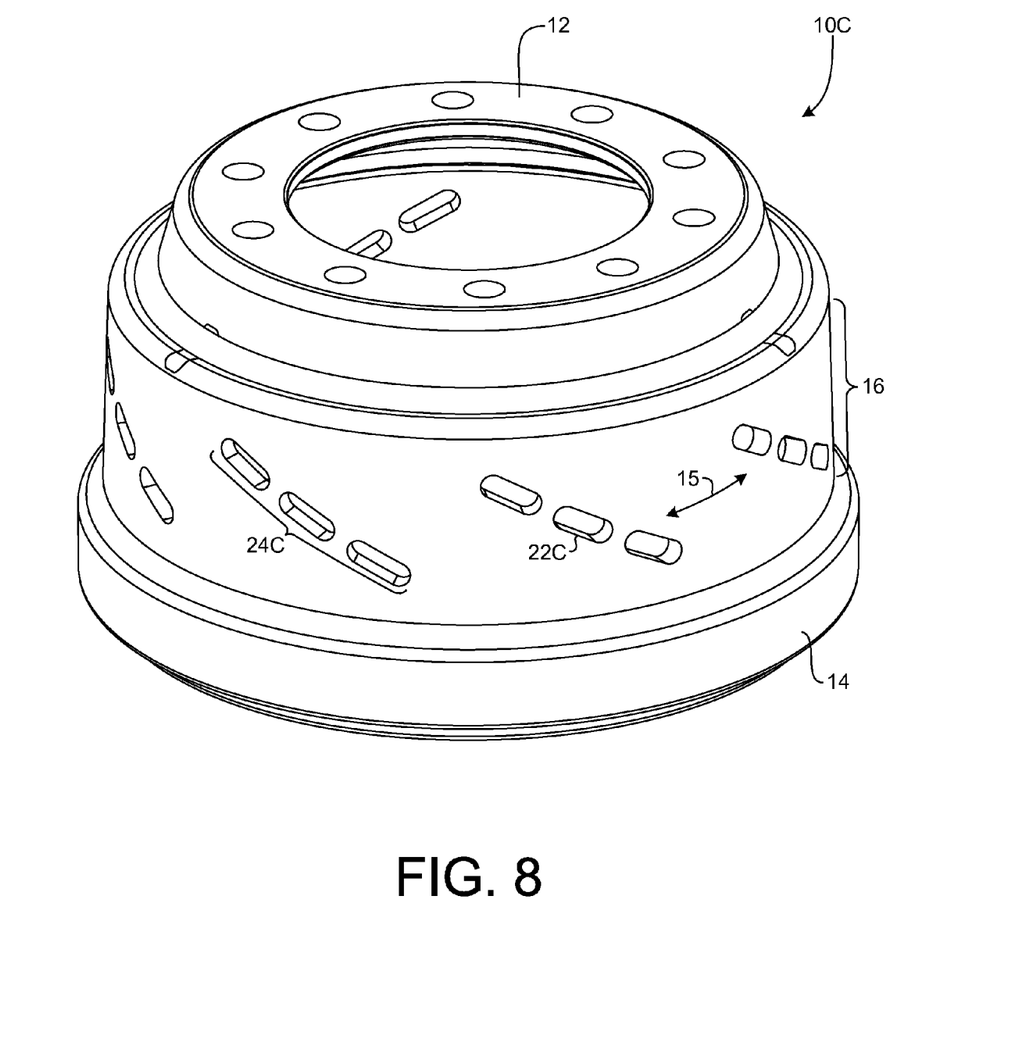

A third embodiment of vented brake drum 10C shown in FIG. 8 is generally similar to the second embodiment but has a different shape of vent openings. In this embodiment, the vent openings are formed as slots 22C having an oblong shape.

Various shapes, sizes and patterns of vent openings can be used. In the third embodiment, the slots 22C are oriented diagonally across the internal braking surface and as a repeating pattern of openings in the form of a line oriented diagonally across the internal braking surface. The slots could alternatively be positioned in a diamond pattern. Or the slots could be aligned with the direction of rotation 15 of the brake drum.

In the illustrated embodiments, the openings are oriented depthwise along a radial line from the axis of the drum portion, and have parallel sides. Alternatively, the holes or slots could be canted relative to the radial line. As a further alternative, the holes or slots can have sides that are tapered toward one another; that is, have nonparallel sides. These parameters can be varied and combined to enhance their ventilation effect in the rotating brake drum.

Advantages of the vent openings in this vented brake drum over the standard solid brake drum include the following:
1. Increases heat dissipation, thus improving the thermal performance and reducing brake fade
2. Creates a path for dissipation of hot gases inside the brake drum to the exterior surroundings 3. Provides a method of brake dust removal by creating an unobstructed path between the inside braking surface to the exterior surroundings
4. Reduces drum weight The vent openings can either be drilled into the brake drum or cast into the drum. The hole size, shape and pattern can vary to optimize ventilation. The accompanying drawings are intended to illustrate the concept and are not restricted to the pattern or number of holes distributed around the circumference of the brake drum. This vented brake drum concept will apply to any size S-CAM brake drum, as well as any other brake drum, without restriction.

Having illustrated and described various embodiments, it should be appreciated that the invention can be modified in arrangement and detail. We claim all embodiments within the scope of the following claims.

The invention claimed is:

1. A vented brake drum consisting essentially of:
   an annular hub portion and drum portion having a cylindrical shape, a circumferential outer surface, and a cylindrical internal braking surface against which a brake lining of a semicircular brake shoe can be frictionally engaged for braking; and
   a series of spaced-apart ventilation openings extending depthwise through the drum portion from the outer surface to the internal braking surface, the series of ventilation openings being distributed in a pattern that is repeated circumferentially in a plurality of said patterns spaced around the drum portion;
   in which each pattern of ventilation openings is in the form of a helical line oriented diagonally across the internal braking surface, each of said patterns positioned in a different circumferential section of the drum such that a single one of each of the ventilation openings occupies a unique circumferential position on the drum.

2. A vented brake drum according to claim 1 in which the openings are formed as holes having a cylindrical shape.

3. A vented brake drum according to claim 1 in which the openings are formed as slots having an oblong shape.

4. A vented brake drum according to claim 3 in which the slots are oriented diagonally across the internal braking surface.

5. A vented brake drum according to claim 1 in which the openings are oriented depthwise along a radial line from an axis of the drum portion.

6. A vented brake drum according to claim 1 in which the openings have parallel sides.

7. A vented brake drum according to claim 1 in which the openings have nonparallel sides.

8. A vented brake drum according to claim 1 in which the openings are cast into the drum.

* * * * *